United States Patent
Song et al.

(10) Patent No.: US 10,916,923 B2
(45) Date of Patent: Feb. 9, 2021

(54) EXTENDABLE CABLE DISTRIBUTION DEVICE AND METHOD FOR MANUFACTURING EXTENDABLE CABLE DISTRIBUTION DEVICE

(71) Applicant: KMW INC., Hwaseong-si (KR)

(72) Inventors: Myunggil Song, Seoul (KR); Inho Kim, Yongin-si (KR); Hyoung-seok Yang, Hwaseong-si (KR); Moonshik Lee, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 183 days.

(21) Appl. No.: 16/145,235

(22) Filed: Sep. 28, 2018

(65) Prior Publication Data
US 2019/0036315 A1    Jan. 31, 2019

Related U.S. Application Data

(63) Continuation of application No. PCT/KR2017/003424, filed on Mar. 29, 2017.

(30) Foreign Application Priority Data

Mar. 31, 2016    (KR) .......................... 10-2016-0039751

(51) Int. Cl.
*H02G 3/08* (2006.01)
*H01R 25/00* (2006.01)
(Continued)

(52) U.S. Cl.
CPC .......... *H02G 3/086* (2013.01); *H01R 13/514* (2013.01); *H01R 25/00* (2013.01); *H02G 1/00* (2013.01);
(Continued)

(58) Field of Classification Search
CPC .......... H02G 3/086; H02G 3/06; H02G 3/088; H02G 3/18; H02G 3/08; H02G 3/16;
(Continued)

(56) References Cited

U.S. PATENT DOCUMENTS 5,231,687 A * 7/1993 Handley .............. G02B 6/4471
385/139
7,136,555 B2 * 11/2006 Theuerkorn ......... G02B 6/3894
385/100

(Continued)

FOREIGN PATENT DOCUMENTS

JP      2011-193638 A     9/2011
KR   10-2006-0008564 A1   1/2006
(Continued)

OTHER PUBLICATIONS

International Search Report for PCT/KR2017/003424, dated Jul. 7, 2017 and its English translation.

*Primary Examiner* — Angel R Estrada (57) ABSTRACT

An extendable cable distribution device in accordance with an embodiment of the present disclosure can include a main block for receiving the end portion of a composite cable supplied from the outside, and providing the passage through which the received composite cable is distributed; at least one sub-block located to be detachable at one side of the main block, and for guiding the distribution direction of a part of the composite cable distributed while passing through the main block; and a connector located on the outer circumferential surface of the at least one sub-block, and electrically connected with at least part of the distributed cable. According to an embodiment of the present disclosure, it is possible to provide the cable distribution device capable of distributing the supplied composite cable and rotating the distributed cable depending upon the direction extended to the outside. In addition, according to an embodi-
(Continued)

ment of the present disclosure, when the distributed cable is added, it is possible to simply extend the cable by the number or in the direction desired by an installer by additionally mounting the modular sub-block.

19 Claims, 7 Drawing Sheets

(51) Int. Cl.
    *H01R 13/514*      (2006.01)
    *H02G 3/18*      (2006.01)
    *H02G 1/00*      (2006.01)
    *H02G 3/06*      (2006.01)
    *H01R 13/506*      (2006.01)

(52) U.S. Cl.
    CPC ............... *H02G 3/06* (2013.01); *H02G 3/088* (2013.01); *H02G 3/18* (2013.01); *H01R 13/506* (2013.01); *H01R 25/006* (2013.01)

(58) Field of Classification Search
    CPC .......... H02G 1/00; H01R 25/00; H01R 25/06; H01R 25/006; H01R 13/506; H01R 13/514
    USPC ........ 174/50, 559, 560, 561, 481, 50.52, 59, 174/60, 68.1, 68.3, 69, 70 R, 71 R, 72 R, 174/72 A, 74 R, 84 R, 95.99 R, 99 E, 174/138 R, 135, 167 R, 95, 99 R
    See application file for complete search history.

(56) References Cited

U.S. PATENT DOCUMENTS

9,042,702 B2 * 5/2015 Rodriguez ............... G02B 6/36
    385/136
9,535,230 B2 * 1/2017 Newbury ............. G02B 6/3825

FOREIGN PATENT DOCUMENTS

| | | |
|---|---|---|
| KR | 10-2011-0014350 A1 | 2/2011 |
| KR | 10-2012-0081312 A1 | 7/2012 |
| KR | 10-2014-0099572 A1 | 8/2014 |

* cited by examiner

EXTENDABLE CABLE DISTRIBUTION DEVICE AND METHOD FOR MANUFACTURING EXTENDABLE CABLE DISTRIBUTION DEVICE

CROSS-REFERENCE TO RELATED APPLICATIONS

This application is a Continuation of International Application No. PCT/KR2017/003424, filed on Mar. 29, 2017, which claims the benefit of and priority to Korean Patent Application No. 10-2016-0039751, filed on Mar. 31, 2016, the content of which are herein incorporated by reference in their entirety.

TECHNICAL FIELD

The present disclosure relates to an extendable cable distribution device and a method for manufacturing an extendable cable distribution device capable of distributing and changing the direction of a composite cable.

BACKGROUND ART

Generally, a composite cable for transmitting and receiving a specific signal such as a radio signal with a high frequency is connected to equipments or parts such as a switching center equipment, a base station equipment, or a repeater.

As the number of antennas located in a base station, etc. increases according to a recent communication method, the number of Remote Radio Heads (RRHs) or the number of connected equipments thereby is increasing. Accordingly, there has been a problem in that in a cable device composed of an input main box connected with a conventional single composite cable, in order to disconnect the cable, the base station management person should an additional connection operation for manually peeling off the photoelectric composite cable and connecting each power line unit or optical unit with the power line unit and optical unit of a jumper cable within a box, such that much time and efforts are required.

In addition, there has been a problem in that even when the composite cable is distributed, it is difficult to locate the distributed cable in various directions depending upon the situations in the conventional integrated box-shaped device, and parts cost is increased and power loss is caused due to the increase in the length of the consumed cable even when re-changing in a new direction.

DISCLOSURE

Technical Problem

The present disclosure designs a rotatable cable distribution device capable of freely changing the direction of the cable, thus saving the installation space occupied by the cable in installing the equipment and the length of the cable.

The present disclosure implements an extendable modular cable distribution device to extend or reduce the number of blocks depending upon the additionally distributed cable so that an installer can easily distribute the cable as many as necessary.

The present disclosure provides a cable distribution device, which can detachably constitute the engagement part of the extendable modular cable block so that an installer can easily replace or repair it.

Technical Solution

An extendable cable distribution device in accordance with an embodiment of the present disclosure can include a main block for receiving the end portion of a composite cable supplied from the outside, and providing the passage through which the received composite cable is distributed; at least one sub-block located to be detachable at one side of the main block, and for guiding the distribution direction of at least part of the composite cable distributed while passing through the main block; and a connector located on the outer circumferential surface of the at least one sub-block, and electrically connected with at least part of the distributed cable.

According to an embodiment of the present disclosure, the sub-block can rotate in the clockwise or counterclockwise direction around the direction perpendicular to the composite cable received in the main block.

According to an embodiment of the present disclosure, the sub-block can have the shape with both ends opened, and can be located in plural parallel to one side of the main block.

According to an embodiment of the present disclosure, a seated part in which the connector is seated can be located on the outer circumferential surface of the sub-block, and the seated part can include a distribution hole that can connect a part of the composite cable and the connector.

According to an embodiment of the present disclosure, the main block and the sub-block can include a fastening part so that the sub-block is engaged to be rotatable with respect to the main block to guide the direction to which the distributed cable is extended.

According to an embodiment of the present disclosure, the extendable cable distribution device can further include a coupling member interposed between the main block and the fastening part of the sub-block, and comprising at least one stepped part so that the main block and the sub-block are engaged to each other not to separate therefrom.

According to an embodiment of the present disclosure, the coupling member can include a ring-shaped body, and the stepped part is separately located in plural bi-directionally around the body.

According to an embodiment of the present disclosure, the main block can include a receiving hole in which the end portion of the composite cable supplied from the outside is received; a cable fastening part including a fastening member for engaging the composite cable received in the receiving hole and the main block; and an extension fastening part rotatably engaged with the sub-block to guide the extension direction of the distributed cable.

According to an embodiment of the present disclosure, the sub-block can include a front fastening part having at least part thereof inserted into and engaged to the extension fastening part of the main block; and a rear fastening part located to face the front fastening part, and engaged with another sub-block or a side surface cover.

According to an embodiment of the present disclosure, the extendable cable distribution device can include a coupling member for inducing the rotation engagement between the main block and the sub-block; and the coupling member can be configured that a plurality of stepped parts are independently engaged to a plurality of engagement holes located on the front fastening part of the sub-block so that the sub-block and the coupling member can simultaneously rotate with respect to the main block.

According to an embodiment of the present disclosure, the extendable cable distribution device can further include at least one ring-shaped sealing member within the main block or the fastening part of the sub-block.

According to an embodiment of the present disclosure, the extendable cable distribution device can further include a side surface cover engaged to the outside of the sub-block, and for preventing the external foreign substance from penetrating into the sub-block or the main block.

According to an embodiment of the present disclosure, the extendable cable distribution device can further include a support bracket connected with the main block or the side surface cover, and for supporting by connecting the cable distribution device with an external device.

A method for manufacturing the extendable cable distribution device in accordance with an embodiment of the present disclosure can include engaging by receiving the end portion of the composite cable supplied from the outside in the main block; engaging at least one sub-block to the outside of the main block depending upon the number of cables required to be distributed from the composite cable; and connecting at least part of the composite cable extended from the main block with the connector located on the sub-block.

Advantageous Effects

According to an embodiment of the present disclosure, it is possible to provide the cable distribution device capable of distributing the supplied composite cable and rotating the distributed cable depending upon the direction extended to the outside.

In addition, according to an embodiment of the present disclosure, when the distributed cable is added, it is possible to simply extend the cable by the number or in the direction desired by an installer by additionally mounting the modular sub-block.

In addition, according to an embodiment of the present disclosure, it is possible to rotate the additional sub-block in real time in the direction desired by the installer depending on the situations, and to provide the waterproof function for blocking inflow of fluid from the outside.

In addition, according to an embodiment of the present disclosure, it is possible to simplify the engagement of the sub-block to be added, thus reducing the work time of the installer.

DESCRIPTION OF DRAWINGS

FIGS. 4A and 4B are a perspective diagram and a cross-sectional diagram illustrating the relationship of the engagement structure of the cable distribution device in accordance with an embodiment of the present disclosure.

DETAILED DESCRIPTION OF MAIN ELEMENTS

| 10: cable distribution device | 20: composite cable |
|---|---|
| 100: main block | 300: sub-block |
| 400: side surface cover | 500: connector |
| 700: coupling member | 800: sealing member |
| 900: support bracket | 110: upper block |
| 130: lower block | 150: receiving hole |
| 170: cable fastening part | 190: extension fastening part |
| 300(a): first sub-block | 300(b): second sub-block |
| 310: front fastening part | 330: rear fastening part |
| 350: seated surface | 351: seated hole |
| 360: engagement hole | 710: body |

BEST MODE

Hereinafter, various embodiments of the present disclosure will be described with reference to the accompanying drawings. It should be understood, however, that the techniques described herein are not intended to be limited to particular embodiments, but rather include various modifications, equivalents, and/or alternatives to the embodiments of this document. In the description of the drawings, like reference numerals can be used for like elements.

The terminologies used herein are only for the purpose of describing particular embodiments and cannot be intended to limit the scope of the other embodiments. The singular expressions can include plural expressions unless the context clearly dictates otherwise. The terms used herein, including technical or scientific terms, can have the same meaning as commonly understood by one of ordinary skill in the art described herein. The terms defined in a general dictionary of the terms used herein can be interpreted in the same or similar meaning as the contextual meanings of the related art, and are not intended to mean ideal or overly formal meanings unless clearly defined in the document. In some cases, the terms defined herein cannot be construed as excluding the embodiments of this document.

Hereinafter, with reference to the accompanying drawings, a cable block device for distributing and extending a composite cable in accordance with an embodiment thereof will be described. Herein, the term of an installer can refer to a person installing an electronic device or a device installing an electronic device (e.g., an artificial intelligence electronic device).

Figure 1:
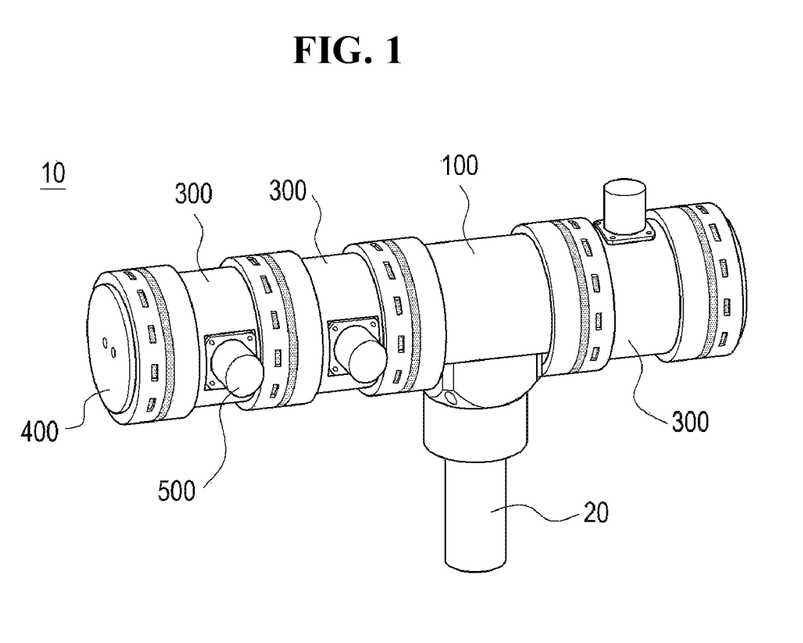
FIG. 1 is a perspective diagram illustrating the outer surface of a cable distribution device in accordance with an embodiment of the present disclosure.

FIG. 1 is a perspective diagram illustrating the outer surface of a cable distribution device in accordance with an embodiment of the present disclosure.

According to an embodiment of the present disclosure, a composite cable 20 supplied to the cable distribution device 10 can be configured to include a plurality of power line units and a plurality of optical units. For example, the composite cable 20 can use an RF cable for transmitting and receiving a specific signal, such as a radio signal with a high frequency, provided to equipment parts such as a switching center equipment, a base station equipment, or a repeater. In addition, the RF cable needs to be distributed into a plurality of cables depending upon the application and the frequency of a signal, and can use a connector manufactured to be suitable for the structural characteristics of the connection part.

According to an embodiment of the present disclosure, the cable distribution device 10 that can be easily connected and replaced can be required in order to distribute the composite cable 20 provided to the base station equipment, for example, a Remote Radio Head (RRH) or a Remote Radio Antenna (RRA) into a plurality of cables 30.

The components of the cable distribution device 10 will be described with reference to FIG. 1.

As illustrated in FIG. 1, the cable distribution device 10 can include a main block 100 for receiving the end portion of the composite cable 20 supplied from the outside and distributing the received composite cable 20, a sub-block 300 connected with the main block 100 to extend and protect the distributed cable 30, and a connector 500 located on the outer circumferential surface of the sub-block 300 and providing the distributed cable 30 to the outside.

According to an embodiment of the present disclosure, the main block 100 can be a tubular housing shape, and can be an injection molding article made of any one material of Polyamic Acid Alkylamine Salts (PAAS), Polyphenylene Sulfide (PPS), and Polyphthal Amide (PPA). The main block 100 can be manufactured by zinc die casting or aluminum die casting, and can be manufactured by processing a metal material. In addition, the outer circumferential surface of the main block 100 can be coated with a material resistant to high salt water. For example, the outer circumferential surface thereof can protect the main block from the external environment by coating or plating with a material that can withstand corrosion, etc. against high salt water.

For another example, the main block 100 can include a lower block 130 in a first direction in which the composite cable 20 provided from the outside is received and an upper block 110 extended in a second direction different from the first direction. The lower block 130 and the upper block 110 can be integrally configured, and the first direction and the second direction can be perpendicular to each other.

According to an embodiment of the present disclosure, the sub-block 300 can be formed of the same material as the main block 100 in the form of a tubular housing shape extended by coupling with the end portion of the main block 100. For example, the sub-block 300 can be an injection molding article made of any one material of PAAS, Polyphenylene Sulfide (PPS), and Polyphthal Amide (PPA). Like the main block 100, the sub-block 300 can be manufactured by zinc die casting or aluminum die casting, and can be manufactured by processing a metal material. In addition, the outer circumferential surface of the sub-block 300 can be coated with a material resistant to high salt water. For example, the outer circumferential surface thereof can protect the sub-block from the external environment by coating or plating with a material resistant to corrosion, etc. against high salt water.

According to an embodiment of the present disclosure, at least one seated surface 350 on which the connector 500 can be seated can be located on the outer circumferential surface of the sub-block 300.

According to an embodiment of the present disclosure, three sub-blocks 300 are engaged to the outside of the main block 100, but the number of the sub-blocks 300 is an example, and various numbers of the sub-blocks 300 desired by the installer can be located. According to the number of the extended sub-blocks 300, the cable 30 distributed from the composite cable 20 depending upon the application and the frequency of the signal can be connected with the connector.

According to an embodiment of the present disclosure, the connector 500 can be a cylindrical metal part that is seated on the seated surface 350 of the sub-block 300. The lower portion surface of the connector 500 is connected with at least part of the composite cable 20, and the upper portion surface of the connector 500 can be connected with a new external cable extended to the outside.

Figure 2:
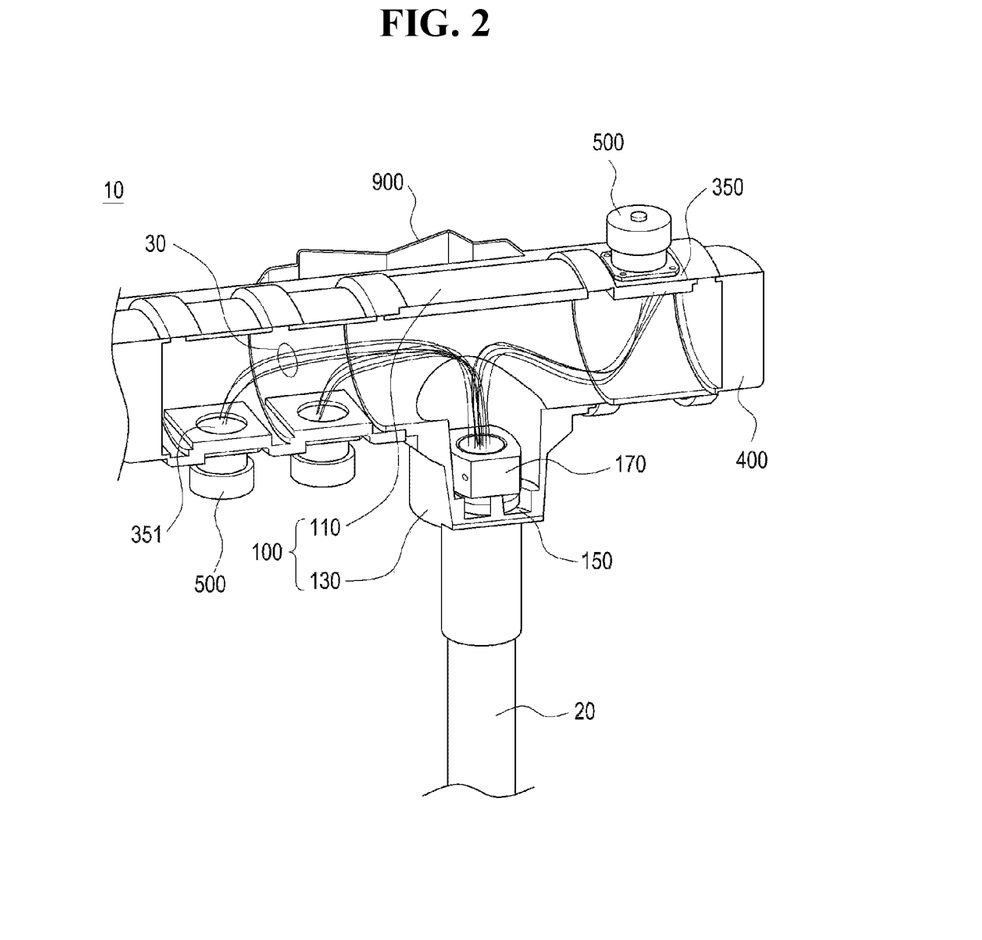
FIG. 2 is a cross-sectional diagram illustrating the inner surface of the cable distribution device in accordance with an embodiment of the present disclosure.

FIG. 2 is a cross-sectional diagram illustrating the inner surface of an extendable cable distribution device in accordance with an embodiment of the present disclosure.

As illustrated in FIG. 2, it can be seen that the composite cable 20 supplied from the outside is distributed, respectively, to be extended to the sub-block 300 within the cable distribution device 10.

According to an embodiment of the present disclosure, the main block 100 can include the lower block 130 and the upper block 110 that are integrally configured in the tubular shape and are opened to each other. The end portion of the lower block 130 can include a receiving hole 150 in which the end portion of the composite cable 20 supplied from the outside is received and a cable fastening part 170 for coupling the composite cable 20 received in the receiving hole 150 and the lower block 130.

According to an embodiment of the present disclosure, the cable fastening part 170 can be engaged with the composite cable 20 using a metal material to provide structural fastening rigidity. The cable fastening part 170 can be a nut, for example, and can be fixedly engaged with the end portion of the composite cable 20 provided with a thread.

However, the end portion of the composite cable 20 can be deformed into various engagement structures provided with a groove or a stepped part in addition to the thread, and according to these deformations, the receiving hole 150 and the cable fastening part 170 can be also deformed in various forms.

According to an embodiment of the present disclosure, the upper block 110 can be connected to the upper portion of the lower block 130, and can be engaged with the sub-block 300 with both sides opened. A part of the composite cable 20 received from the lower block 130 can be distributed within the upper block 110 for each frequency depending upon various applications.

According to an embodiment of the present disclosure, both end portions that are open to both sides of the upper block 110 can include an extension fastening part 190 that is engaged with the sub-block 300. The extension fastening part 190 is mutually engaged with a front fastening part 310 of the sub-block 300, and can be configured to have a greater size than the sub-block 300 so that the end portion of the sub-block 300 can be inserted therein. For example, the tubular-shaped extension fastening part 190 can have a diameter greater than that of the tubular-shaped front fastening part 310 so that the front fastening part 310 of the sub-block 300 can be inserted into and engaged to the extension fastening part 190.

According to an embodiment of the present disclosure, the extension fastening part 190 of the upper block 110 is inserted into and engaged with the front fastening part 310 of the sub-block 300 to form a groove therein, and a sealing member 800 can be located in the groove. The sealing member 800 can provide a waterproof function for preventing external fluid from penetrating into the cable distribution device 10 (see FIGS. 4 and 5). A detailed description of the sealing member 800 will be described later.

According to an embodiment of the present disclosure, the sub-block 300 can have a tubular shape with both ends opened, and can provide a passage through which the distributed cable 30 in the main block 100 passes. One end of the sub-block 300 can be provided with the front fastening part 310 having at least part inserted into and engaged with the extension fastening part 190 of the main block 100. In addition, the other end of the sub-block 300 is located to face the front fastening part 310, and can be provided with a rear fastening part 330 engaged with another sub-block 300 or the side surface cover 400.

According to an embodiment of the present disclosure, the inside opening of the front fastening part 310 can provide an inlet into which the distributed cable 30 delivered from the main block 100 or another sub-block 300 enters. In addition, the inside opening of the rear fastening part 330 can provide an outlet for delivering the distributed cable 30 to another sub-block 300.

According to an embodiment of the present disclosure, the sub-block 300 can distribute the cable 30 distributed from the composite cable 20 by connecting the front fastening part 310 and the main block 100. For another example, the sub-block 300 can extend the distributed cable 30 through the connection between the rear fastening part 330 and another sub-block 300.

According to an embodiment of the present disclosure, the extendable cable distribution device 10 can engage the rear fastening part 330 of the sub-block 300 with the side surface cover 400, thus blocking the additional distribution of the composite cable 20 and preventing foreign substance from penetrating from the outside.

According to an embodiment of the present disclosure, the sub-block 300 can include the seated surface 350 on which the connector 500 is seated. The seated surface 350 can be located on the outer circumferential surface of the sub-block 300, and include at least one seated hole 351 that can be connected with the inside of the sub-block 300.

As another example, the seated surface 350 is interposed between the front fastening part 310 of the sub-block 300 and the rear fastening part 330 thereof, and can be formed in the groove shape that at least part of the lower side of the connector 500 can be received. The groove is provided in the shape corresponding to the lower side of the connector 500, such that the connector 500 can be easily supported and fixedly attached thereto.

According to an embodiment of the present disclosure, the seated hole 351 can provide a passage that the distributed cable 30 can be connected with the connector 500. The distributed cable 30 in the main block 100 or the sub-block 300 can contact the lower surface of the connector 500 through the seated hole 351 to be electrically connected thereto.

According to an embodiment of the present disclosure, the composite cable 20 (3pair*12core) provided to the main block 100 is a structure that can be distributed into three distributed cables 30. Three sub-blocks 300 can be engaged to the side surface of the main block 100 so that the installer converts the composite cable 20 into three distributed cables 30. Firstly, the extension fastening part 190 located on both sides of the main block 100 and the front fastening part 310 of the sub-block 300 can be engaged to extend the length of the cable distribution device 10. In addition, it is possible to extend yet another sub-block 300 to the outside of the engaged sub-block 300, and to provide the distributed cable 30 (1pair*4core) for each sub-block 300. By connecting the respective distributed cables 30 to the connector 500 of the respective sub-blocks 300, it is possible to implement a total of three distributed cables by a simple operation. Then, it is possible to easily control the direction to the rotatable sub-block 300 so that the installer can connect it with the external cable in the desired direction.

Hereinafter, the rotation configuration of the engagement part of the main block 100 or the sub-block 300, respectively, will be described in detail.

Figure 3:
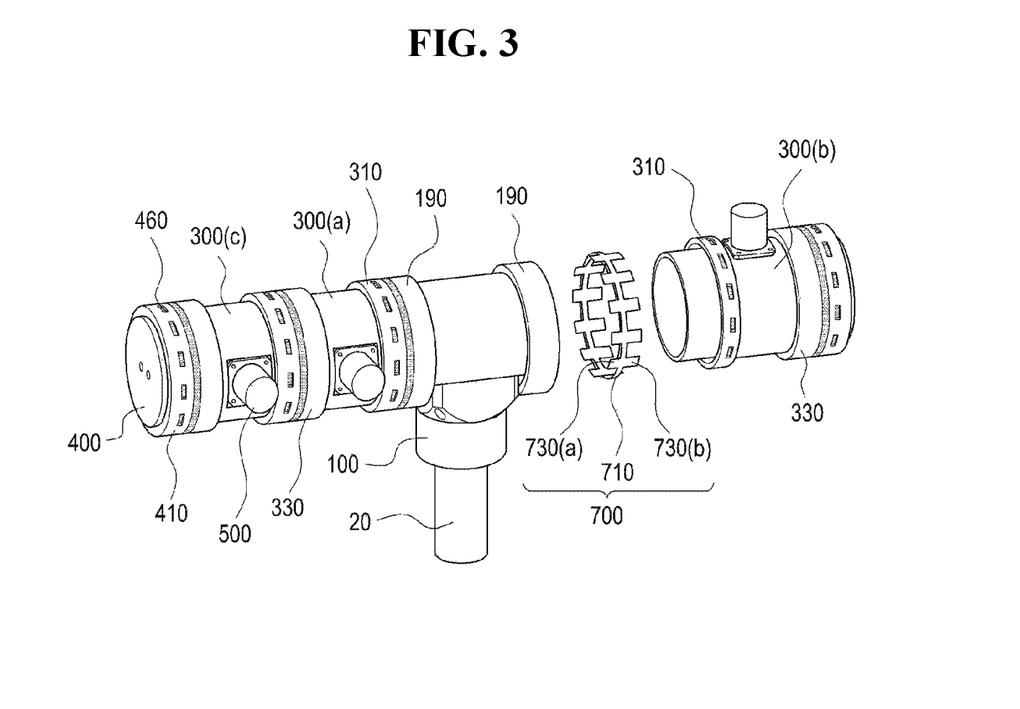
FIG. 3 is an exploded perspective diagram illustrating the engagement fastening structure between a main block and a sub-block in accordance with an embodiment of the present disclosure.
Figure 4A:
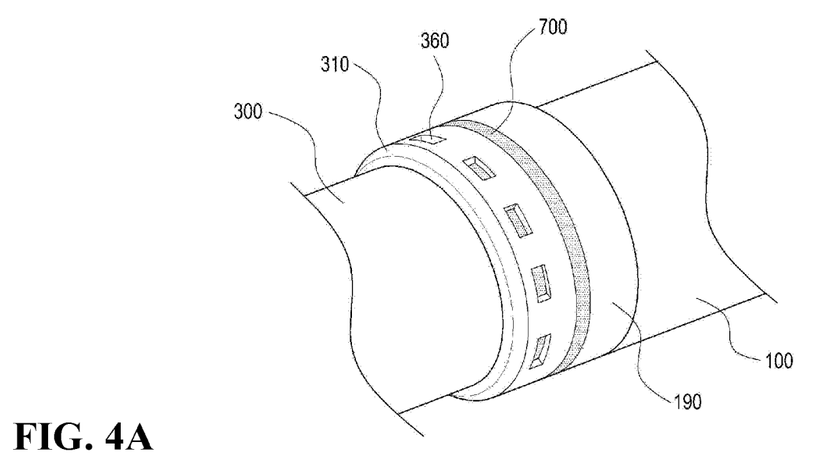
FIG. 4A is an enlarged perspective diagram illustrating a fastening part of the cable distribution device.
Figure 4B:
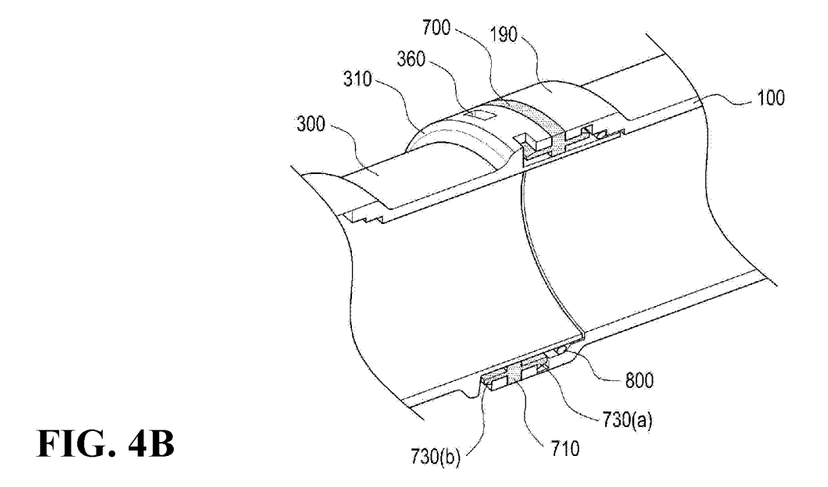
FIG. 4B is a cross-sectional diagram illustrating the inside of the fastening part of the cable distribution device.
Figure 5:
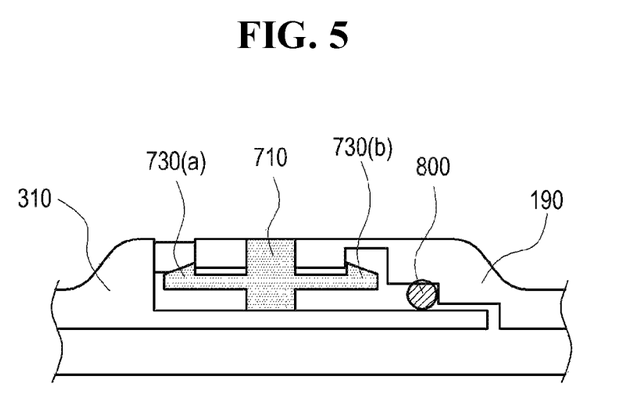
FIG. 5 is an enlarged cross-sectional diagram of FIG. 4B.

FIG. 3 is an exploded perspective diagram illustrating the engagement fastening structure between the main block and the sub-block in accordance with an embodiment of the present disclosure. FIGS. 4A and 4B are a perspective diagram and a cross-sectional diagram illustrating the relationship of the engagement structure of the cable distribution device in accordance with an embodiment of the present disclosure. FIG. 4A is an enlarged perspective diagram illustrating the fastening part of the cable distribution device, and FIG. 4B is a cross-sectional diagram illustrating the inside of the fastening part of the cable distribution device. FIG. 5 is an enlarged cross-sectional diagram of FIG. 4B.

As illustrated in FIGS. 3 to 5, the cable distribution device 10 can include a coupling member 700 for inducing so that the fastening part of the main block 100 or that of the sub-block 300 can rotate each other. Herein, the fastening part includes the extension fastening part 190 of the main block 100 and the front fastening part 310 of the sub-block 300, and specifically, means the configuration that the front fastening part 310 of the sub-block 300 is inserted into and engaged to the extension fastening part 190 of the main block 100.

The cable distribution device 10 in accordance with an embodiment of the present disclosure includes the main block 100 and the sub-block 300, and in FIG. 3, the sub-block 300 located to face the left side of the main block 100 is referred to a first sub-block 300(a), and the sub-block 300 located to face the right side of the main block 100 is referred to as a second sub-block 300(b). In addition, the sub-block located at the left side of the first sub-block 300(a) is referred to as a third sub-block 300(c).

The coupling member 700 in accordance with an embodiment of the present disclosure can include at least one stepped part 730(a),(b) interposed between the extension fastening part 190 of the main block 100 and the front fastening part 310 of the first sub-block 300(a) or that of the second sub-block 300(b) so that the main block 100 and the first sub-block 300(a) or the main block 100 and the second sub-block 300(b) are engaged to each other not to separate therefrom.

The coupling member 700 in accordance with another embodiment thereof can include at least one stepped part 730(a),(b) interposed between the rear fastening part 330 of the first sub-block 300(a) and the front fastening part 310 of the third sub-block 300(c) so that the first sub-block 300(a) and the third sub-block 300(c) are engaged to each other not to separate therefrom.

According to an embodiment of the present disclosure, the rear fastening part 330 of the second sub-block 300(b) of the cable distribution device 10 and the rear fastening part 330 of the third sub-block 300(c) thereof can be engaged to the side surface cover 400, thus blocking the cable distribution device 10 from the outside.

According to an embodiment of the present disclosure, the coupling member 700 can include the stepped parts 730(a),(b) that are configured to include a closed curved shape (e.g., a ring shape) body 710, and are separately located bi-directionally around the body 710.

According to an embodiment of the present disclosure, the lower end of the body 710 of the coupling member 700 can be located on one surface of the front fastening part 310 of the first sub-block 300(a) so that they can slidably rotate simultaneously with the engagement in order to simultaneously rotate with the sub-block 300.

According to an embodiment of the present disclosure, the stepped parts 730(a),(b) of the coupling member 700 can include the first stepped part 730(a) for engaging with the front fastening part 310 of the first sub-block 300(a) and the second stepped part 730(b) for engaging with the extension fastening part 190 of the main block 100. The first stepped part 730(a) and the second stepped part 730(b) can be configured in plural. Herein, FIG. 3 illustrates the example that the coupling member 700 having the first stepped part 730(a) and the second stepped part 730(b) is interposed between the front fastening part 310 of the second sub-block 300(b) and the extension fastening part 190 of the main block 100, but it is apparent that the coupling member 700 having the first stepped part 730(a) and the second stepped part 730(b) is identically interposed between the front fastening part 310 of the first sub-block 300(a) and the extension fastening part 190 of the main block 100 as well.

The front fastening part 310 of the first sub-block 300(a) for engaging with the first stepped part 730(a) can include a plurality of engagement holes 360. Each of the plurality of engagement holes 360 can be individually fitted and fixed to each of the first stepped part 730(a). Accordingly, when the first sub-block 300(a) rotates to change the direction of the distributed cable 30, the coupling member 700 can also rotate simultaneously in response to the rotation of the first sub-block 300(a).

On the other hand, the extension fastening part 190 of the main block 100 for engaging with the second stepped part 730(b) can include one engagement hole 360 having the closed curved shape. The one engagement hole 360 can be fitted and fixed to the second stepped part 730(b) so that the sub-block is not separated therefrom. However, the engagement between the second stepped part 730(b) and the engagement hole 360 is not fixedly engaged in the rotational direction of the first sub-block 300(a), such that the coupling member 700 can rotate. That is, only the coupling member 700 can rotate while the main block 100 does not rotate.

According to an embodiment of the present disclosure, the second sub-block 300(b) is engaged to the right side of the main block 100, and can be engaged and rotated in the same manner as the first sub-block 300(a). For example, the stepped parts 730(a),(b) of the coupling member 700 can include the first stepped part 730(a) for engaging with the front fastening part 310 of the second sub-block 300(b) and the second stepped part 730(b) for engaging with the extension fastening part 190 of the main block 100. The first stepped part 730(a) and the second stepped part 730(b) can be configured in plural.

The front fastening part 310 of the second sub-block 300(b) for engaging with the first stepped part 730(a) can include the plurality of engagement holes 360. Each of the plurality of engagement holes 360 can be individually fitted and fixed to each of the first stepped parts 730(a).

Accordingly, when rotating to change the direction of the distributed cable 30 to the second sub-block 300(b), the coupling member 700 can also rotate simultaneously in response to the rotation of the second sub-block 300(b).

According to an embodiment of the present disclosure, by engaging the coupling member 700 and the main block 100 or the sub-block 300, the sub-block 300 can rotate with respect to the fixed main block 100. Accordingly, the connector 500 located on the outer circumferential surface of the sub-block 300 can rotate together with the sub-block 300 so that the installer can connect the distributed cable 30 in the desired direction to an external device (e.g., a cable).

There has been a problem in that since the distributed cable is connected to the external cable in the fixed direction, when the external cable is located in the direction opposite to the direction in which the connector is located, the length of the external cable is additionally further required and the external cable is twisted. In addition, there has been a problem in that power loss is caused due to the extended length of the external cable.

However, since the extendable cable distribution device 10 in accordance with the present disclosure implements the rotatable sub-block 300 so that the installer can freely change the location of the connector depending upon the direction of the external cable, it is possible to save parts cost and to minimize power loss.

In addition, the sub-block 300 can be additionally extended and removed depending upon the distributed cable, thus reducing the work time of the installer.

Figure 6:
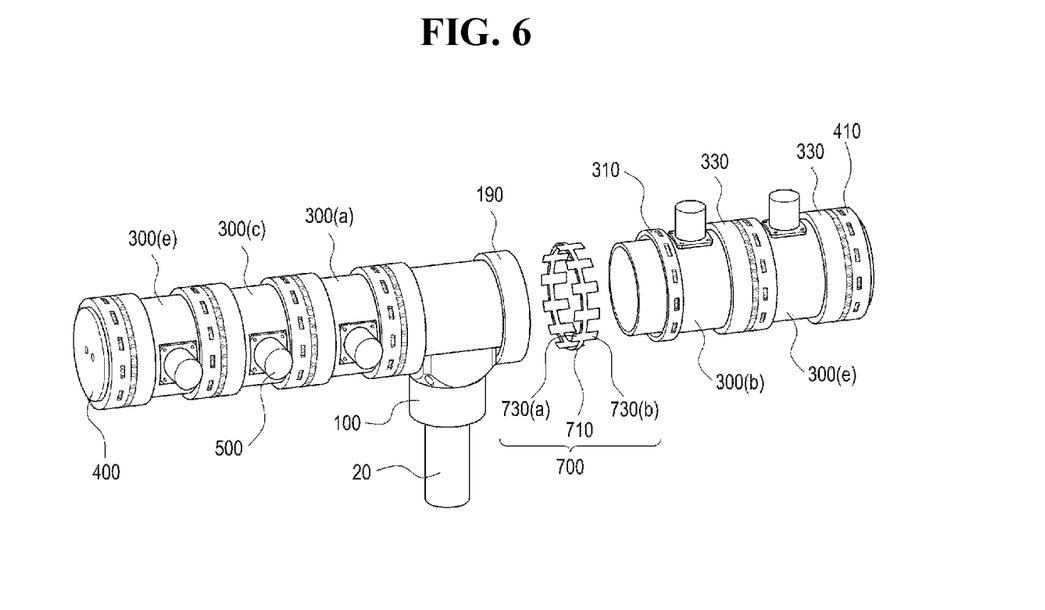
FIG. 6 is an exploded perspective diagram illustrating the engagement fastening structure between the main block and the sub-block in accordance with another embodiment of the present disclosure.

FIG. 6 is an exploded perspective diagram illustrating the engagement fastening structure between the main block and the sub-block in accordance with another embodiment of the present disclosure.

As illustrated in FIG. 6, when additional cable distribution is required over the sub-blocks 300 used in FIG. 3, the cable distribution device 10 can use by engaging additional sub-block 300.

FIG. 3 illustrates the structure that the composite cable 20 (3pair*12core) provided to the main block 100 can be distributed into three distributed cables 30, but FIGS. 4A and 4B illustrate the structure that the composite cable 20 (5pair*20core) provided to the main block 100 can be distributed into five distributed cables 30.

According to an embodiment of the present disclosure, the composite cable 20 (3pair*12core) provided to the main block 100 is a structure that can be distributed into five distributed cables. In order for the installer to convert the composite cable 20 into five distributed cables, five sub-blocks 300 can be engaged to the side surface of the main block 100. Firstly, the extension fastening part 190 located at both sides of the main block 100 is engaged with the front fastening part 310 of the sub-block 300 to extend the length of the cable distribution device 10. In addition, it is possible to extend another sub-block 300 to the outside of the engaged sub-block 300, and to provide the distributed cable 30 (1pair*4core) for each sub-block 300. When each of the distributed cables 30 is connected to the connector 500 of each sub-block 300, a total of five distributed cables can be implemented by a simple operation. Then, it is possible to easily control the direction to the rotatable sub-block 300 so that the installer can connect it with the external cable in the desired direction.

In FIG. 6, while the first sub-block 300(a), the second sub-block 300(b), and the third sub-block 300(c) of FIG. 3 are connected to the main block 100, the connection structure of a fourth sub-block 300(d) and a fifth sub-block 300(e) will be additionally described. Since the coupling member 700 has the same structure, its specific configuration is omitted.

According to an embodiment of the present disclosure, the stepped parts 730(a),(b) of the coupling member 700 can include the first stepped part 730(a) for engaging with the front fastening part 310 of the fifth sub-block 300(e) and the second stepped part 730(b) for engaging with the rear fastening part 330 of the third sub-block 300(c).

According to an embodiment of the present disclosure, the front fastening part 310 of the fifth sub-block 300(e) for engaging with the first stepped part 730(a) can include the plurality of engagement holes 360. Each of the plurality of engagement holes 360 can be individually fitted and fixed to each of the first stepped parts 730(a). Accordingly, the coupling member 700 can also rotate simultaneously in response thereto upon rotation for changing the direction of the distributed cable 30 to the fifth sub-block 300(e).

On the other hand, the rear fastening part 330 of the third sub-block 300(c) for engaging with the second stepped part 730(b) can include one engagement hole 360 having the closed curved shape. The one engagement hole 360 can be fitted and fixed to the second stepped part 730(b) so that the sub-block is not separated therefrom. However, the engagement between the second stepped part 730(b) and the engagement hole 360 is not fixedly engaged in the rotation direction of the third sub-block 300(c), such that the coupling member 700 can rotate. That is, only the coupling member 700 can rotate while the main block 100 does not rotate.

According to an embodiment of the present disclosure, the fourth sub-block 300(d) is engaged to the right side of the second sub-block 300(b), and can be engaged and rotated in the same manner as the fifth sub-block 300(e). For example, the stepped parts 730(a),(b) of the coupling member 700 can include the first stepped part 730(a) for engaging with the front fastening part 310 of the fourth sub-block 300(d) and the second stepped part 730(b) for engaging with the rear fastening part 330 of the second sub-block 300(b). The first stepped part 730(a) and the second stepped part 730(b) can be configured in plural.

The front fastening part 310 of the fourth sub-block 300(d) for engaging with the first stepped part 730(a) can include the plurality of engagement holes 360. Each of the plurality of engagement holes 360 can be individually fitted and fixed to each of the first stepped parts 730(a).

Accordingly, the coupling member 700 can also rotate simultaneously in response thereto upon rotation for changing the direction of the distributed cable 30 to the sub-block 300.

According to an embodiment of the present disclosure, by engaging the coupling member 700 and the fourth and fifth sub-blocks 300(d), 300(e), and the second and third sub-blocks 300(b), 300(c), the fourth and fifth sub-blocks 300(d), 300(e) can rotate with respect to the second and third sub-blocks 300(b), 300(c). Accordingly, the connector 500 located on the outer circumferential surface of the fourth and fifth sub-blocks 300(d), 300(e) can rotate with the sub-block 300 so that the installer can connect the distributed cable 30 in the desired direction with the external device (e.g., the external cable).

According to an embodiment of the present disclosure, the total number of the five sub-blocks 300 has been located at both sides of the main block 100. However, the number of the sub-blocks 300 is not limited thereto, and the additional sub-block 300 having the same fastening structure can be extended by the number of distributions of cable desired by the installer, and the already installed sub-block 300 can be also removed easily.

Referring again to FIGS. 4 and 5, the fastening part can be a fastening structure between the main block 100 and the sub-block 300, and can be a fastening structure between the sub-block 300 and another sub-block 300. As described above, the fastening structure of the sub-block 300 can have the fastening relationship between the main block 100—the first sub-block 300(a)—the third sub-block 300(c)—the fifth sub-block 300(e). In addition, it can be the fastening relationship between the main block 100—the second sub-block 300(b)—the fourth sub-block 300(d).

According to an embodiment of the present disclosure, the cable distribution device 10 can further include a sealing member 800 interposed between the main block 100 and the first sub-block 300(a), and for blocking the inflow of fluid from the outside.

According to an embodiment of the present disclosure, the sealing member 800 has a ring shape, and is located in contact with the lower portion of the extension fastening part 190 of the main block 100 and the upper portion of the front fastening part 310 of the sub-block 300 so that the internal space of the cable distribution device 10 can be blocked from the outside. The sealing member 800 can be located on the same line as the coupling member 700 around one surface of the front fastening part 310 at the outside of the coupling member 700.

According to an embodiment of the present disclosure, a groove can be formed depending upon the engagement between the main block 100 and the sub-block 300 or between the sub-blocks 300, and the sealing member 800 can be inserted into the groove. Since the end portion of the groove can provide a gap that can enter into the main block 100 or the sub-block 300, the sealing member 800 is to block it. Herein, the sealing member 800 can include an elastic material that is pressed by the engagement of the main block 100 and the sub-block 300. Since the upper surface of the sealing member 800 is located in contact with the sub-block, a friction force is provided depending upon the rotation of the sub-block 300 so that the installer can provide a rotational texture when manually rotating the sub-block 300. As another example, the sealing member 800 can be located in plural in the groove in order to extend the waterproof performance.

According to an embodiment of the present disclosure, the sealing member 800 can be interposed between the main block 100 and the second sub-block 300(b) or between the main block 100 and the first sub-block 300(a) or between the first sub-block 300(a) and the third sub-block 300(c). As another example, it can be also interposed between the second sub-block 300(b) and the fourth sub-block 300(d) or between the third sub-block 300(c) and the fifth sub-block 300(e).

According to an embodiment of the present disclosure, the cable distribution device 10 can have the side surface cover 400 located on both ends, thus blocking the internal space from the external environment. The side surface cover 400 can have the cylindrical shape with one surface closed, and the opened other surface thereof can include the front fastening part 410 for engaging with the rear fastening part 330 of the sub-block 300 (see FIG. 3).

According to an embodiment of the present disclosure, the front fastening part 410 of the side surface cover 400 can have the same structure and function as the front fastening part 310 of each sub-block 300. For example, in order to engage with the sub-block 300 through the coupling member 700, it can include a plurality of engagement grooves 460 for engaging with the stepped parts 730(a),(b) of the coupling member 700. As another example, the front fastening part 410 of the side surface cover 400 can be configured to have a diameter smaller than the rear fastening part 330 of the sub-block 300 in order to be inserted into the rear fastening part 330 of the sub-block 300.

According to an embodiment of the present disclosure, a support bracket 900 can be located on the outer circumferential surface of the cable distribution device 10 to fix the device (see FIG. 2). The support bracket 900 can be located on the outer circumferential surface of the main block 100, and can be engaged with an external device so that the composite cable 20 faces upward and downward to fix the cable distribution device 10.

The main block 100 can be fixed by the support bracket 900 to support the center of the cable distribution device 10 upon the relative rotation of the sub-block 300 so that the installer can advantageously connect the external cable in the desired direction.

The support bracket 900 in accordance with an embodiment of the present disclosure can be connected to the outer surface of the side surface cover 400 in addition to the outer circumferential surface of the main block 100 to fix the device. As the support bracket 900 supports the center and both end portions of the cable distribution device 10, the sub-block 300 can rotate so that the installer can advantageously connect the external cable in the desired direction.

Hereinafter, a method for manufacturing the extendable cable distribution device in accordance with various embodiments will be described.

Figure 7:
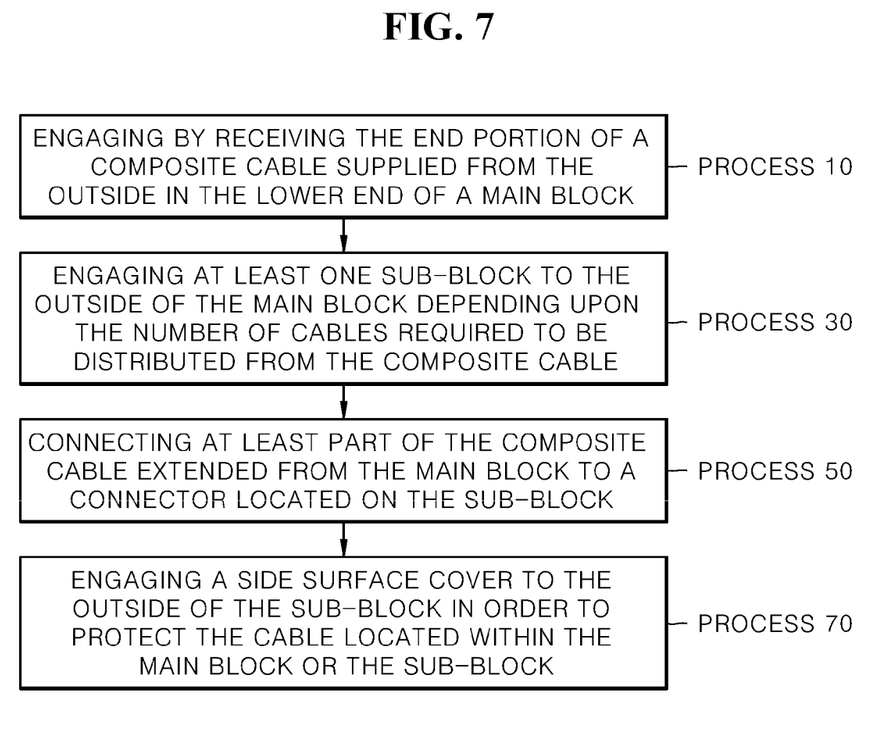
FIG. 7 is a flowchart illustrating a method for manufacturing the extendable cable distribution device in accordance with an embodiment of the present disclosure.

FIG. 7 is a flowchart illustrating a method for manufacturing the extendable cable distribution device in accordance with an embodiment of the present disclosure.

As illustrated in FIG. 7, according to a process 10, the method for manufacturing the cable distribution device 10 first performs engaging by receiving the end portion of the composite cable 20 supplied from the outside in the main block 100.

However, the installer can calculate the number of cables necessary for the entire sub-blocks 300 by presetting the number of cables to be distributed in the composite cable 20. For example, as illustrated in FIG. 3, when the installer wishes to use three distributed cables 30 depending upon the frequency required for the composite cable 20, the main block 100 and three sub-blocks 300 to be located at both sides thereof can be prepared in advance and manufactured. As another example, as illustrated in FIGS. 4A and 4B, when the installer wishes to use five distributed cables 30 depending upon the frequency required for the composite cable 20, the main block 100 and the five sub-blocks 300 to be located at both sides thereof can be prepared in advance and manufactured.

According to an embodiment of the present disclosure, the main block 100 can be the integrated tubular shape and manufactured to include the lower block 130 and the upper block 110 that are open to each other. The end portion of the lower block 130 can include the receiving hole 150 in which the end portion of the composite cable 20 supplied from the outside is received and the cable fastening part 170 for engaging the composite cable 20 received in the receiving hole 150 and the lower block 130.

According to an embodiment of the present disclosure, the cable fastening part 170 can be engaged with the composite cable 20 using a metal material to provide structural fastening rigidity.

According to an embodiment of the present disclosure, the upper block 110 can be connected to the upper portion of the lower block 130, and open to both sides thereof to be engaged to the sub-block 300. Distributing a part of the composite cable 20 received from the lower block 130 within the upper block 110 can be performed.

After the main block 100 and the composite cable 20 are engaged to each other, according to the process 30, engaging at least one sub-block 300 to the outside of the main block 100 depending upon the number of cables required to be distributed from the composite cable 20 can be performed.

According to an embodiment of the present disclosure, the sub-block 300 can have a tubular shape with both ends opened, and can provide a passage through which the distributed cable 30 in the main block 100 passes.

The one end of the sub-block 300 is provided with the front fastening part 310 having at least part inserted into and engaged to the extension fastening part 190 of the main block 100, and the other end of the sub-block 300 is located to face the front fastening part 310 and can be provided with the rear fastening part 330 for engaging with another sub-block 300 or the side surface cover 400.

According to an embodiment of the present disclosure, the inside opening of the front fastening part 310 can provide an inlet into which the distributed cable 30 delivered from the main block 100 or another sub-block 300 enters. In addition, the inside opening of the rear fastening part 330 can provide an outlet for delivering the distributed cable 30 to another sub-block 300.

According to an embodiment of the present disclosure, the coupling member 700 can be interposed between the extension fastening part 190 of the main block 100 and the front fastening part 310 of the sub-block 300, and can include at least one stepped part 730($a$),($b$) so that the main block 100 and the sub-block 300 are engaged to each other not to separate therefrom.

According to another embodiment of the present disclosure, the coupling member 700 is interposed between the rear fastening part 330 of the sub-block 300 and the front fastening part 310 of another sub-block 300, and can include at least one stepped part 730($a$),($b$) so that the sub-blocks 300 are engaged to each other not to separate therefrom.

According to an embodiment of the present disclosure, the lower end of the body 710 of the coupling member 700 can be located on one surface of the front fastening part 310 of the sub-block 300, and can slidably rotate simultaneously with the engagement in order to simultaneously rotate with the sub-block 300.

According to an embodiment of the present disclosure, the stepped parts 730($a$),($b$) of the coupling member 700 can include the first stepped part 730($a$) for engaging with the front fastening part 310 of the sub-block 300 and the second stepped part 730($b$) for engaging with the extension fastening part 190 of the main block 100. The first stepped part 730($a$) and the second stepped part 730($b$) can be configured in plural.

The front fastening part 310 of the sub-block 300 engaged with the first stepped part 730($a$) can include the plurality of engagement holes 360. Each of the plurality of engagement holes 360 can be individually fitted and fixed to each of the first stepped parts 730($a$). Accordingly, when the first sub-block 300($a$) rotates for changing the direction of the distributed cable 30, the coupling member 700 can also rotate simultaneously in response thereto.

On the other hand, the extension fastening part 190 of the main block 100 for engaging with the second stepped part 730($b$) can include one engagement hole 360 having the closed curved shape. The one engagement hole 360 can be fitted and fixed to the second stepped part 730($b$) so that the sub-block is not separated therefrom. However, the engagement between the second stepped part 730($b$) and the engagement hole 360 is not fixedly engaged in the rotation direction of the sub-block 300, such that the coupling member 700 can rotate. That is, only the coupling member 700 can rotate while the main block 100 does not rotate.

According to an embodiment of the present disclosure, it is apparent that the simultaneous rotation and fixed structure of the coupling member 700 can be also applied between another sub-blocks 300.

Thereafter, according to a process 50, connecting at least part of the composite cable extended from the main block 100 with the connector 500 located in the sub-block can be performed.

Before the process 30, the installer can locate the connector 500, which is electrically connected with the distributed cable 30 to connect it with the external cable, in the sub-block 300.

According to an embodiment of the present disclosure, the connector 500 can be configured so that the sub-block 300 is seated on the seated surface 350 located on the outer circumferential surface thereof, and the seated surface 350 includes at least one seated hole 351 that can be connected with the inside of the sub-block 300.

According to an embodiment of the present disclosure, the seated hole 351 can provide a passage through which the distributed cable 30 can be connected with the connector 500. Accordingly, the distributed cable 30 in the main block 100 or the sub-block 300 can be electrically connected in contact with the bottom surface of the connector 500 through the seated hole 351.

Thereafter, according to a process 70, in order to protect the composite cable 20 or the distributed cable 30 located within the main block 100 or the sub-block 300, engaging the side surface cover 400 to the outside of the sub-block 300 can be performed.

The side surface cover 400 can be located on both ends of the cable distribution device 10, thus blocking the inner space from the external environment. The side surface cover 400 can be configured to include the front fastening part 410 having one surface formed of the closed cylindrical shape and having the opened other surface engaged with the rear fastening part 330 of the sub-block 300.

According to an embodiment of the present disclosure, the front fastening part 410 of the side surface cover 400 can have the same structure and function as the front fastening part 310 of the sub-block 300 described above. For example, in order to engage with the sub-block 300 through the coupling member 700, it can include the plurality of engagement grooves 460 for engaging with the stepped parts 730(a),(b) of the coupling member 700. For another example, the front fastening part 410 of the side surface cover 400 can be configured to have a diameter smaller than the rear fastening part 330 of the sub-block 300 in order to be inserted into the rear fastening part 330 of the sub-block 300.

The method for manufacturing the cable distribution device 10 in accordance with an embodiment of the present disclosure can implement the rotatable sub-block 300 so that the installer can freely change the location of the connector depending upon the direction of the external cable, thus saving parts cost and minimizing the power loss.

In addition, in order to extend a necessary cable depending upon the frequency, it is possible to easily extend the sub-block 300, and the extension method is also simple, thus shortening the work time of the installer.

As described above, while the extendable cable distribution device of various embodiments of the present disclosure is not limited to the embodiments and drawings described above, but it will be apparent to those skilled in the art to which the present disclosure pertains that various substitutions, deformations, and modifications can be made within the technical scope of the present disclosure.

INDUSTRIAL APPLICABILITY

According to the present disclosure, it is possible to manufacture the cable distribution device, which can design to freely convert the direction of the cable, thus saving the installation space occupied by the cable and the cable length upon the installation of the equipment.

The invention claimed is:

1. An extendable cable distribution device, comprising:
    a main block for receiving an end portion of a composite cable, and providing a passage through which the composite cable is distributed;
    at least one sub-block detachably attached to at one side of the main block, and for guiding a distribution direction of a part of the composite cable passing through the main block; and
    a connector disposed on an outer circumferential surface of the at least one sub-block, and electrically connected with the part of the composite cable,
    wherein the at least one sub-block is rotatable with respect to the main block.

2. The extendable cable distribution device of claim 1, wherein the at least one sub-block is configured to rotate in a clockwise or counterclockwise direction around a direction perpendicular to a longitudinal direction of the composite cable received in the main block.

3. The extendable cable distribution device of claim 1, wherein the at least one sub-block has two open ends, and two or more sub-blocks are disposed in tandem to one side of the main block.

4. The extendable cable distribution device of claim 1, wherein a seating portion in which the connector is seated is disposed on the outer circumferential surface of the at least one sub-block, and the seating portion comprises a distribution hole which is configured to connect the part of the composite cable and the connector.

5. The extendable cable distribution device of claim 1, wherein each of the main block and the at least one sub-block comprises a fastener engaged so that the at least one sub-block is rotatable with respect to the main block to guide a direction to which the distributed cable extends.

6. The extendable cable distribution device of claim 5, further comprising a coupler interposed between the fastener of the main block and the fastener of the at least one sub-block, wherein the coupler comprises at least one stepped part so that the main block and the at least one sub-block are engaged to each other and not to separate therefrom.

7. The extendable cable distribution device of claim 6, wherein the coupler comprises a ring-shaped body, and two or more stepped parts are separately disposed on both sides of the body.

8. The extendable cable distribution device of claim 6, further comprising at least one ring-shaped sealing member inside the main block or the fastener of the at least one sub-block.

9. The extendable cable distribution device of claim 1, wherein the main block comprises:
    a receiving hole in which the end portion of the composite cable is received;
    a cable fastener comprising a fastening member for engaging the composite cable received in the receiving hole and the main block; and
    an extension fastener rotatably engaged with the at least one sub-block to guide the extension direction of the distributed cable.

10. The extendable cable distribution device of claim 9, wherein the at least one sub-block comprises:
- a front fastener at least a part of which is inserted into and engaged with the extension fastener of the main block; and
- a rear fastener disposed to face the front fastener, and engaged with another sub-block or a side cover.

11. The extendable cable distribution device of claim 10, comprising a coupler for inducing a rotational engagement between the main block and the at least one sub-block,
- wherein the coupler is configured so that a plurality of stepped parts are independently engaged to a plurality of engagement holes disposed on the front fastener of the at least one sub-block so that the sub-block and the coupler are capable of simultaneously rotating with respect to the main block.

12. The extendable cable distribution device of claim 11, further comprising at least one ring-shaped sealing member inside the main block or the front fastener of the at least one sub-block.

13. The extendable cable distribution device of claim 1, further comprising a side cover engaged to an outermost end of the at least one sub-block, and for preventing an external foreign substance from penetrating into the at least one sub-block or the main block.

14. The extendable cable distribution device of claim 1, further comprising a support bracket disposed to be connected with the main block or the side cover, and for supporting by connecting the cable distribution device with an external device.

15. A method for manufacturing an extendable cable distribution device, comprising:
- engaging by receiving an end portion of a composite cable in a lower end of a main block;
- engaging at least one sub-block to an outermost end of the main block depending upon a number of cables required to be distributed from the composite cable;
- connecting at least a part of the composite cable extended from the main block with a connector disposed on the at least one sub-block; and
- rotating the at least one sub-block with respect to the main block.

16. The method for manufacturing the extendable cable distribution device of claim 15, further comprising engaging a side cover to an outermost end the at least one sub-block in order to protect the cable disposed in the main block or the at least one sub-block.

17. The method for manufacturing the extendable cable distribution device of claim 15,
- wherein in the engaging the at least one sub-block to the outermost end of the main block, the at least one sub-block is engaged to be rotatable with respect to the main block to guide a direction in which the cable distributed from the composite cable extends.

18. The method for manufacturing the extendable cable distribution device of claim 15, comprising locating the connector connected with at least a part of the composite cable in a seating surface disposed on an outer circumferential surface of the at least one sub-block, before the engaging the at least one sub-block to the outermost end of the main block.

19. The method for manufacturing the extendable cable distribution device of claim 15,
- wherein the engaging the at least one sub-block to the outermost end of the main block comprises locating a ring-shaped coupler between the main block and a fastener of the at least one sub-block so that the main block and the at least one sub-block are rotatably engaged.

* * * * *